United States Patent
Tomingas et al.

[15] 3,649,987
[45] Mar. 21, 1972

[54] FLEXIBLE VEHICLE WIPER

[72] Inventors: Henry R. Tomingas, Route 2, Box 633, Golden, Colo. 80401; Ralph P. Zook, 4226 Clay Street, Denver, Colo. 80211

[22] Filed: June 8, 1970

[21] Appl. No.: 44,318

[52] U.S. Cl. .............................................15/245, 15/250.42
[51] Int. Cl. ............................................................A47l 1/06
[58] Field of Search ......................................15/245, 250.42

[56] References Cited

UNITED STATES PATENTS

| | | | |
|---|---|---|---|
| 2,772,435 | 12/1956 | Louk | 15/245 |
| 3,413,675 | 12/1968 | Westrum | 15/245 |
| 3,131,414 | 5/1964 | Wise | 15/250.42 |
| 3,368,230 | 2/1968 | Kramer | 15/245 X |

*Primary Examiner*—Peter Feldman
*Attorney*—Reilly and Lewis

[57] ABSTRACT

A utility wiper tool for use on curved surfaces and particularly the curved body surfaces of motor vehicles includes an elongated, flexible wiper element supported by and preferably releasably connected to an elongated flexible backing strip. The backing strip preferably is formed as a part of a one-piece wiper element support frame including a pair of opposed, relatively rigid support arms having hinge extensions joining the support arms to the back side of the backing strip at spaced points along the backing strip so as to permit the wiper element and backing strip to flex longitudinally as a unit in such a way that the wiper element will conform to curved surfaces over which it is moved. The wiper element may take the form of a relatively thin blade to dry the surface or a wider circular body made of an absorbent material to apply wax and the like.

13 Claims, 7 Drawing Figures

PATENTED MAR 21 1972 3,649,987
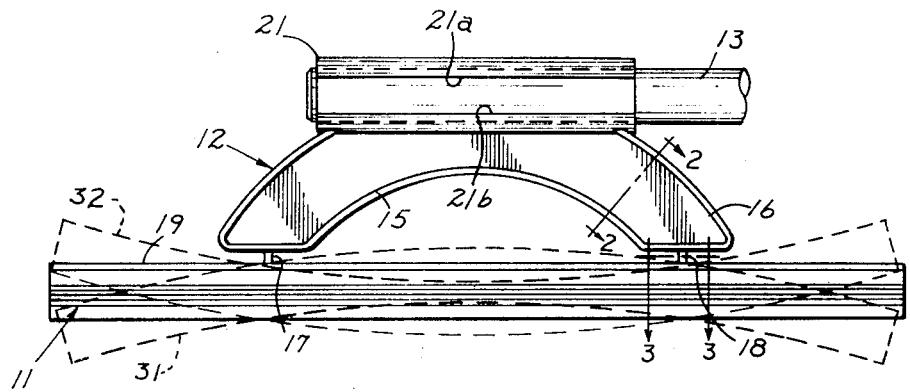
FIG. 1
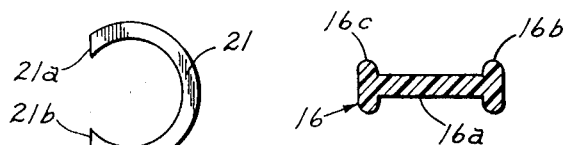
FIG. 2     FIG. 3
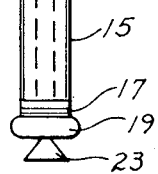
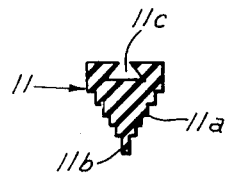
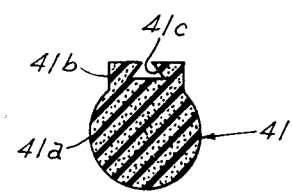
FIG. 6    FIG. 5    FIG. 7
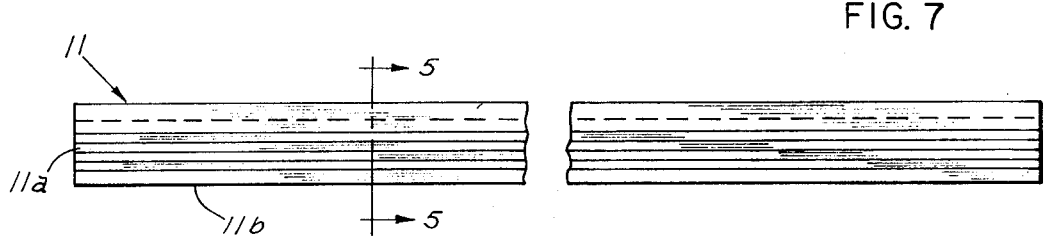
FIG. 4
INVENTORS
HENRY R. TOMINGAS
RALPH P. ZOOK
BY
Reilly and Lewis
ATTORNEYS

FLEXIBLE VEHICLE WIPER

This invention relates to a novel and improved flexible wiper device particularly adapted to wipe across curved surfaces such as vehicle body surfaces.

With the recent increase in the use of rapid automatic car washing installations, there is a need for a device which will rapidly wipe across the curved surfaces of the vehicle so as to dry the rinse water from the body and windows of motor vehicles without streaks. As a further step in servicing the vehicle body a wax is sometimes applied to these vehicle body surfaces. The most common devices presently in use to dry the vehicle body surface are the chamois or sponge. While these devices are satisfactory, considerable time is required to cover the entire surface due to the necessity of making repeated strokes over the same surface, and there is the further problem that if the chamois or sponge is not kept relatively dry by a continual wringing out they tend to leave streaks of residual dirt, detergents and water spots. Some attempts have been made to provide a squeegee-type wiper device with an elongated flexible edge but in general the prior art devices have not proved entirely satisfactory for present applications.

Accordingly, it is an object of this invention to provide a novel and improved flexible wiper device which is capable of a thorough wiping action over the curved surfaces of vehicle bodies and the like using a single stroke.

Another object of this invention is to provide a simple, durable and relatively inexpensive wiper device suitable for drying or applying wax to motor vehicle bodies and the like which may be mass-produced at a relatively small cost.

A further object of this invention is to provide an improved flexible wiper device for vehicle body surfaces which may be made as two parts defined as a wiper element and a support frame using relatively inexpensive moldable plastic materials and in which one or more types of wiper element parts may be interchangeably mounted on the same support frame part.

Still a further object of this invention is to provide a wiper device characterized by a one-piece molded flexible wiper element which releasably connects to a flexible backing strip forming an integral part of a one-piece support frame with the backing strip being mounted at spaced points of support to a rigid, outwardly projecting support arms by a pair of relatively narrow flexible one-piece extensions which permit concave and convex bending of the backing strip and thereby the supported wiper element to wipe both concavely and convexly curved surfaces.

In accordance with the present invention in a preferred embodiment there is shown an elongated flexible wiper element which may take the form of either a flexible blade suitable for drying the surface or a flexible applicator for applying liquid wax to the surface together with a support frame, molded of a plastic such as polyethylene, including a pair of relatively rigid outwardly extending support arms having a rigid handle socket along one side and hinge extensions at the ends of the arms which integrally attach at spaced points of support to the back of an elongated flexible backing strip parallel to the handle socket to provide flexible support for the wiper element. The backing strip is adapted to releasably connect to the wiper element and to this end has an outwardly projecting tongue along one edge which releasably fits into a complementary groove extending along the back edge with the wiper element so they may be readily assembled and disassembled and, when assembled, the wiper element is supported in such a way as to flex both concavely and convexly to conform to double-curved surfaces such as those present on vehicle body surfaces.

Other objects, advantages and capabilities of the present invention will become more apparent as the description proceeds taken in conjunction with the accompanying drawings in which:

FIG. 1 is a side elevation view of a wiper device embodying features of the present invention with concave and convex flexed positions of the wiper element and backing strip shown in dashed lines;

FIG. 2 is a sectional view taken along lines 2—2 of FIG. 1 drawn to a larger size and approximately full scale;

FIG. 3 is a sectional view taken along lines 3—3 of FIG. 1 drawn to an enlarged scale;

FIG. 4 is a fragmentary side elevation view of the wiper blade shown in FIG. 1, disassembled from the support frame;

FIG. 5 is a sectional view taken along lines 5—5 of FIG. 4;

FIG. 6 is an end elevation view of the frame shown in FIG. 1 at approximately full scale; and FIG. 7 is a sectional view of another form of wiper element suitable for applying wax to a curved surface.

Referring now to the drawings, the wiper device shown in FIGS. 1–6 is suitable for drying a surface and is of a two-piece construction which comprises a blade-type wiper element 11 supported by a support frame 12 from which there extends a third part or handle 13 disposed parallel to the wiper element 11. The wiper element 11 is in the form of an elongated, integral body, preferably molded from a soft flexible material, having a downwardly and inwardly tapered cross section with downwardly and inwardly stepped opposite sides represented at 11a terminating in a relatively thin bottom wiping edge represented at 11b. The wider top portion of the wiper element 11 is formed with an open groove 11c defined by opposed undercut inner sides and a flat bottom. The blade-type wiper element 11 is preferably molded of a relatively soft, flexible material, which may be a thermoplastic material commonly sold under the commercial name of KRATON.

The support frame 12 shown is also in the form of an integral one-piece body, also preferably molded from a more rigid plastic material such as polyethylene, and comprises a pair of outwardly extending, relatively rigid support arms 15 and 16 arranged along an arc which are provided with narrowed flexible hinge extensions or web-like membranes 17 and 18 at the ends of arms 15 and 16, respectively. The hinge extensions provide spaced points of support for a flexible backing strip 19. A rigid handle socket 21 is formed along the top edge of the support frame opposite and generally parallel to the backing strip 19 and takes the form of a partial, open-ended cylinder having a relatively wide side slot or socket area defined by opposed fingers 21a and 21b of the cylinder to permit the insertion and removal of the cylindrical handle 13 of a selected length which provides an extension capability for the device so that it may be readily applied to a less accessible surface, such as across the top of the vehicle.

The backing strip 19 is coextensive with the blade to provide support therefor and the two are releasably joined by a connector tongue 23 on the backing strip having outwardly sloping sides and a flat bottom which is complementary to that of the top groove 11c of the wiper element 11 and the tongue will thereby releasably insert into the top groove in the wiper blade element by flexing the upper side portions defining the groove 11c.

As best shown in FIG. 2, arms 15 and 16 of the support frame are of a generally I-shaped cross section for rigidity and in this way are sufficiently rigid to resist the compression forces applied thereto through the hinge extensions as the wiper blade and backing strip flex to conform to the curved surfaces. The hinge extensions or membranes 17 and 18 are formed integrally with the support arms and backing strip and have a cross section with slightly rounded corners and the greatest length thereof is in a direction transversely of the backing strip. These hinge extensions have opposite concave surfaces as viewed from the side of the device in FIG. 1 which make the extensions narrower at the center and wider at the ends joined integrally with the arms and backing strip which permits them to yield under the flexing action of the backing strip and blade element as shown in FIG. 1. Therefore it is apparent that the support frame body 12 as well as the wiper element 11 may be readily molded as a single part and the two parts conveniently assembled and disassembled by the user.

In the use of the device shown in FIGS. 1–6, the assembled backing strip and wiper element provides a flexible support about a pair of spaced points of support to permit the wiper element and backing strip to flex longitudinally either concavely as represented by dashed lines 31 or convexly as represented by dashed lines 32 in the direction of the support frame arms while the hinge extensions 17 and 18 yield either forwardly or rearwardly and in this way the wiper element will readily conform to the double-curved surfaces found on the vehicle body such as on the hood, between the hood and the fenders, and the like. While the blade-type wiper element shown in FIGS. 1–6 may most efficiently be used to wipe the surface dry, the same support frame 12 is also suitable for supporting other wiper elements such as a wax applicator 41 as shown in FIG. 7. This wiper element takes the form of an elongated generally cylindrical body represented at 41a *made with absorbent surfaces which may be made of the foam rubber shown or a felt covered flexible cylinder or the like. This wiper element 41 includes an upper flat portion 41b* with a groove 41c similar in shape to that found on the blade-type wiper element 11 along its back side so that it may also be releasably attached to the backing strip 23 of the support frame 12 in the same way above described relative to wiper element 11. Thus, once the vehicle surface has been dried by the applicator, it may then apply the wax uniformly to the curved surfaces of the vehicle.

While a tongue-and-groove type releasable connection is shown for joining the backing strip to the wiper element, it is understood that a variety of releasable connectors may be used such as for example a series of protrusions and aligned apertures arranged along the adjacent sides of the wiper element and backing strip. While it is understood that other forms of hinged or flexible hinge connections can be provided between the support arms and the backing strip, the integral hinge construction is particularly simple and durable and can readily be molded so as to substantially reduce the cost of the resulting product.

Although the present invention has been described with a certain degree of particularity, it is understood that the present disclosure has been made by way of example and that changes in details of structure may be made without departing from the spirit thereof.

What is claimed is:

1. A flexible wiper device for use on the curved surfaces of vehicle bodies and the like comprising an elongated flexible wiper portion and support portion for the wiper portion including a support frame having a pair of relatively rigid, outwardly extending spaced support arms forming a part of a grip for the user adapted to resist compression forces along said arms with relatively narrow hinge extensions at the outer ends of said support arms and a flexible backing strip attached to said hinge extensions at spaced points along the back side of said backing strip, the support arms, hinge extensions and backing strip forming the support frame being made as a one-piece, molded plastic unit, the hinge extensions having opposed concave surfaces as viewed from the side making the hinge sections narrower at the center and wider at the ends, the end portions of the backing strip project substantially beyond the hinge extensions so that the wiper portion and backing strip flex together both concavely and convexly in wiping across curved surfaces.

2. A flexible wiper device as set forth in claim 1 wherein said wiper portion is releasably connected to said backing strip.

3. A flexible wiper device as set forth in claim 1 wherein said support frame includes a handle socket portion integral with and oppositely of said support arms to releasably support a handle.

4. A flexible wiper device as set forth in claim 3 wherein said socket portion is disposed generally parallel to said backing strip and is integral with and fixedly secured to the back of said support arms.

5. A flexible wiper device as set forth in claim 1 wherein said wiper portion includes a longitudinal groove with undercut sides formed in its back side throughout its lengthwise extent and adapted to receive a complementary outwardly diverging tongue formed on a side of said backing strip.

6. A flexible wiper device as set forth in claim 1 wherein said support frame is made of a relatively rigid polyethylene material.

7. A flexible wiper device as set forth in claim 1 wherein said wiper portion is formed of a relatively soft thermosetting plastic material.

8. A flexible wiper device as set forth in claim 1 wherein said wiper portion is in the form of a generally cylindrical body having an absorbent exterior wiping surface to apply waxes and the like.

9. A flexible wiper device as set forth in claim 1 wherein said wiper portion is in the form of a downwardly converging flexible blade terminating in an elongated, relatively thin flexible wiping edge.

10. A flexible wiper device for use on the curved surfaces of vehicle bodies and the like comprising an elongated wiper portion and a support frame for the wiper portion formed of a one-piece molded plastic body including a pair of outwardly extending relatively rigid support arms arranged along an arc to resist compression forces and along the arms having narrowed flexible hinge membranes at the outer ends of the arms and integral therewith to provide spaced points of support for an elongated, flexible, backing strip integral with said hinge membranes, and coextensive with said wiper element, the end portions of the backing strip projecting substantially beyond the hinge membranes whereby said hinge membranes yield to permit said wiper element and backing strip to flex longitudinally over both concave and convex curves over which the wiper portion is moved, and a tubular handle socket slotted along one side and rigidly mounted on the back side of said support arms forming a part of a grip for the user and extending generally parallel to said backing strip, there being releasable coupling portions on said wiper portion and backing strip to facilitate the assembly and disassembly thereof.

11. A flexible wiper device as set forth in claim 1 wherein said support arms have a generally I-shaped cross section with a wider section along the peripheral edge thereof.

12. A flexible wiper device as set forth in claim 10 wherein said wiper portion is coextensive with said backing strip.

13. A flexible wiper device for use on the curved surfaces of vehicle bodies and the like comprising an elongated flexible wiper portion and a support means for the wiper portion having a support member with a pair of outwardly extending spaced flexible support hinges on the support member, and a flexible backing strip integral with the ends of said support hinges at spaced points of support along said backing strip and a handle portion integral with and fixedly secured to the support member oppositely of and generally parallel to said backing strip and transverse to said hinges forming a grip for the user, the support member, hinges and backing strip being made as a one-piece molded plastic unit, the hinges being narrower at the center and wider at the ends to permit the strip to flex inwardly and outwardly, the end portions of the backing strip projecting substantially beyond the hinges so that the wiper portion and backing strip flex together both concavely and convexly in wiping across curved surfaces.

* * * * *